Oct. 8, 1963 H. MAGNUSSEN 3,106,019
TOOL FOR PNEUMATIC CHIPPING HAMMERS
Filed June 25, 1962 2 Sheets-Sheet 2
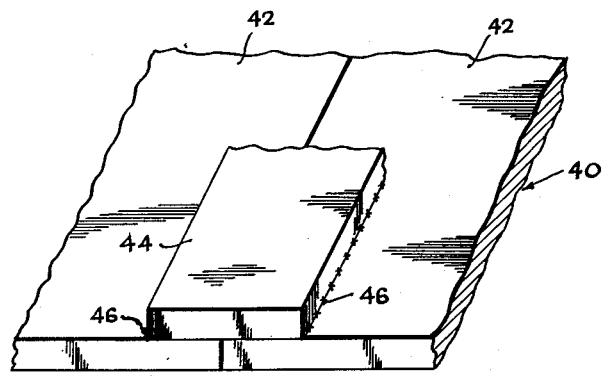
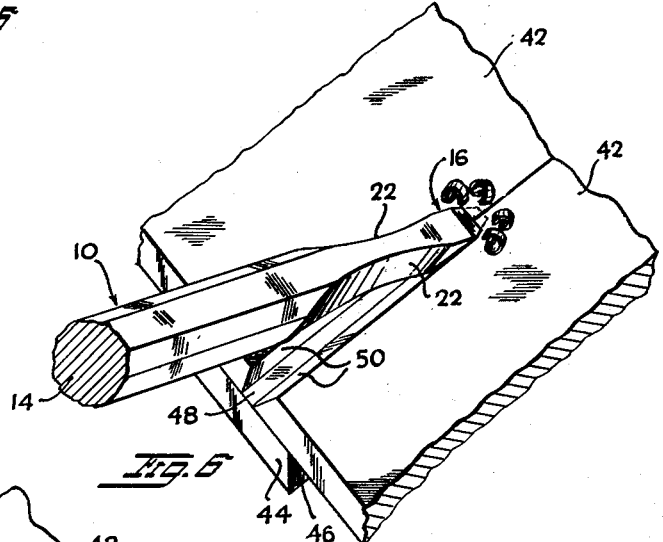
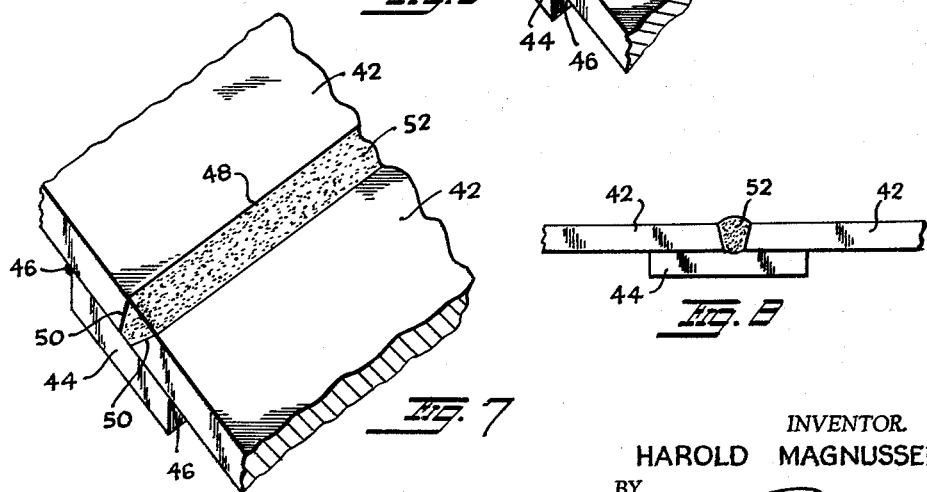
INVENTOR.
HAROLD MAGNUSSEN
BY
ATTORNEY

United States Patent Office 3,106,019
Patented Oct. 8, 1963

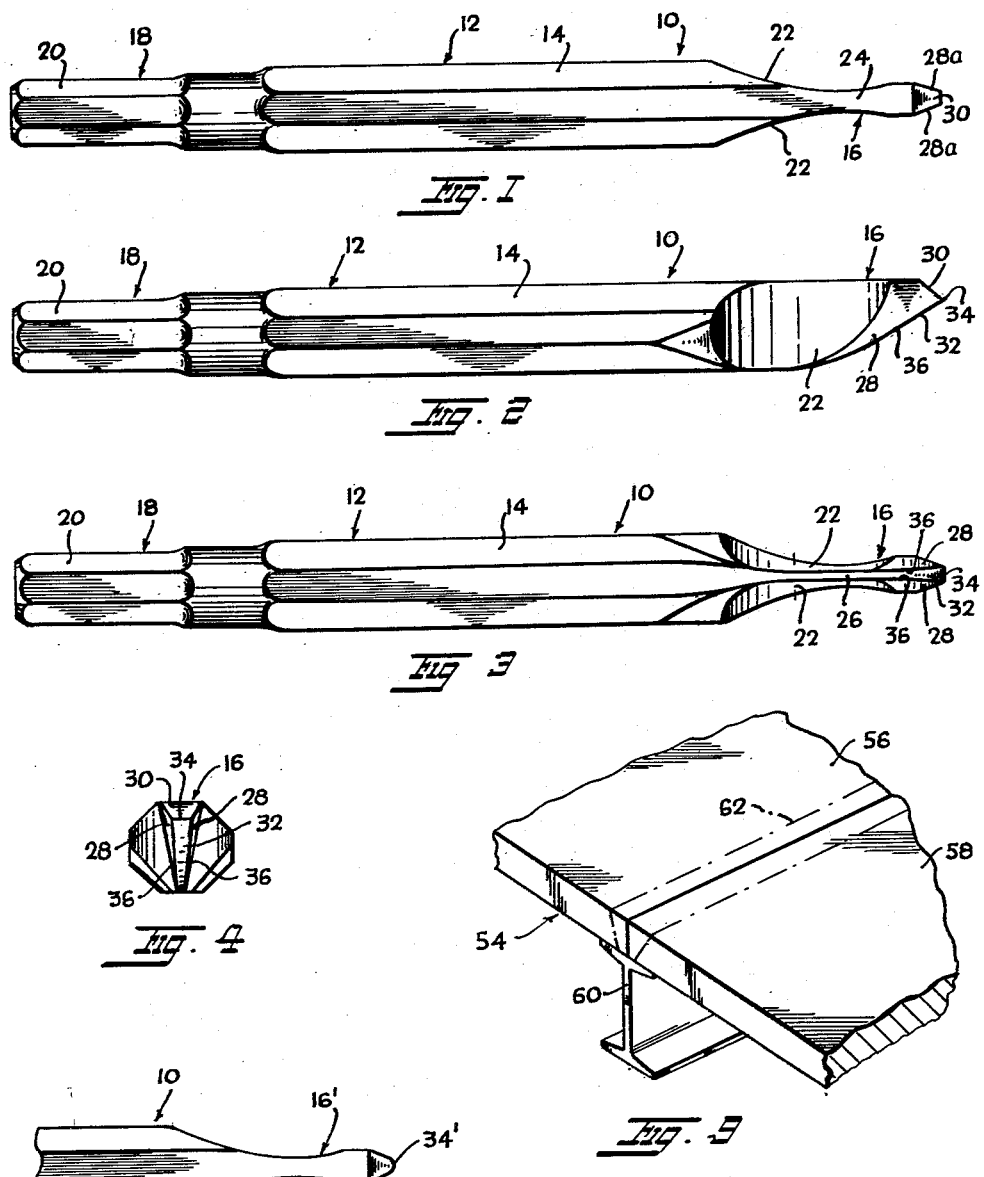

3,106,019
TOOL FOR PNEUMATIC CHIPPING HAMMERS
Harold Magnussen, 55 Tieman Place, New York, N.Y.
Filed June 25, 1962, Ser. No. 204,842
2 Claims. (Cl. 30—168)

This invention relates generally to metal working and more particularly to a chisel or tool for forming grooves or channels in metal work.

Heretofore in chipping or cutting a bevel groove or channel between aluminum plates having their long edges in abutment and having a backing plate or strap spanning the joint between the plates and welded thereto, two chisels were used, a flat cape chisel to cut the flat or base of the groove and a flat chisel or side cutter to cut the bevel walls on both sides of the groove or channel. Such procedure takes considerable time and often results in a defective or nonuniform groove or channel causing distortion in the weld joint, and often results in ragged edges and burrs on the side walls of the groove. The flat chisels also have a tendency to mar and damage the backing plate or strap and also have a tendency to force the plates away from the backing plate or strap leaving a space between the plates and backing strap that has to be eliminated.

A principal object of the present invention is to eliminate the above disadvantages by providing a chisel so constructed that it is adapted to cut and shape a uniform groove with a flat base and with beveled side walls.

Another object of the invention is to provide a chisel that will cut a substantially V-shaped groove with a smooth base and with smooth side walls.

A further object of the invention is to provide an improved chisel which may be driven into the joint between abutting metal plates and thereby remove the metal on both sides of the joint, the chisel being provided with portions for bearing against the flat vertical side faces of the plates so as to maintain the tool in a position to permit the cutting action to progress along lines coinciding with the planes of the side surfaces of the plates.

For further comprehension of the invention and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a top plan view of a chisel embodying my invention.

FIG. 2 is a side elevational view thereof.

FIG. 3 is a bottom plan view thereof.

FIG. 4 is a view looking from the right of FIG. 1.

FIG. 5 is a bottom perspective view of two metal plates in abutting relation with a backing plate spanning the joint between the plates, a structure adapted to be grooved by the chisel of FIG. 1.

FIG. 6 is a top view of the structure of FIG. 5 with the chisel of FIG. 1 shown cutting a groove in the structure, parts being broken away.

FIG. 7 is a view similar to FIG. 6 showing the groove cut in the plates at the joint and showing the plates welded to each other and to the backing plate.

FIG. 8 is a fragmentary front elevational view showing a completed weld joint in the structure of FIG. 5.

FIG. 9 is a top plan view of two metal plates in abutting relation with an I-beam spanning the joint between the plates, a structure adapted to be grooved by the chisel of FIG. 1.

FIG. 10 is a top plan view of the working end of a chisel embodying a modified form of the invention.

Referring in detail to the drawings, in FIG. 1 a chisel made in accordance with the present invention is shown and designated generally by the reference numeral 10. The chisel 10 is formed of tool steel and comprises a cylindrical shank 12 with flat sides 14, a reduced flat cutting head 16 and a cylindrical handle 18 with flat sides 20. The steel is tempered after shaping. The handle is shaped to enter a chuck connected with an ordinary chipping hammer used with compressed air.

The cutting head 16 is formed by cutting away the metal of the shank on both sides forming opposed dished-out portions constituting clearances 22, 22 curved transversely and tapering upwardly and outwardly producing substantially vertically straight sides, wider at the top as indicated at 24 and narrower at the bottom as indicated at 26 in FIGS. 1 and 3. Outwardly of each dished-out portion 22, the head is formed with an upwardly tapering portion or edge 28$^a$ tapering to a point at the bottom of the head. The edges 28$^a$ are sharp and constitute cutting edges. The free extremity of the head is formed with a slightly downwardly tapering top end 30, the end edge of said top end 30 intersecting an upwardly curved bottom end 32 forming a sharp cutting edge 34. The sides of the upwardly curved bottom end 32 intersect the front ends of the tapering portions 28, forming edges 36 at the sides and front of the head.

The improved chisel 10 is used for cutting grooves or channels in metal work, such for example, the structure 40 shown in FIG. 5, comprising a pair of juxtaposed aluminum plates 42, 42 with their long flat edges in abutment with each other. A backing strap or plate 44 is positioned over the joint between the plates and is welded to the plates along its long edges as indicated at 46. In order to weld the adjacent long edges of the plates 42, 42 to each other and to the backing strap 44, a groove 48 is cut along the joint between the plates. The groove is readily cut by means of the chisel 10 by operatively connecting the handle 18 to a pneumatic chipping hammer (not shown), inverting the structure 40 to the position of FIG. 6, positioning the cutting edge of the head 16 over the end of the joint between the plates and then by actuating the hammer and guiding the head 16 along the joint whereby the metal on both sides of the joint down to the top surface of the strap 44 will be cut away, the clearances 22, 22 on both sides of the head preventing binding and jamming during operation. The edges 28$^a$, 28$^a$ of the cutting head intersect the downwardly tapering top end 30 to form sharp edges for forming beveled side walls 50, 50 along the groove 48. When the groove is completely cut, welding apparatus (not shown) heats the side walls 50 of the groove and the molten metal welds the side walls to each other and to the top surface of the backing strap 40 as indicated at 52 in FIG. 8. The welding operation may be performed by any suitable welding apparatus.

In FIG. 9, another example of a structure 54 capable of being grooved by the chisel 10 is shown. The structure 54 is shown as comprising a pair of juxtaposed aluminum plates 56 and 58 with their long edges in abutment. Underneath the plates and spanning the joint therebetween is an I-beam 60. The chisel 10 can readily cut a groove indicated in dot-dash lines 62 in order to condition the structure for welding the long edge walls of the groove to each other and to the top surface of the I-beam 60 similar to the manner followed in welding the plates 42, 42 to each other and to the backing strip 40.

In FIG. 10, a modified form of cutting head 16' is shown. The head 16' differs from the cutting head 16 in rounding the extreme end 34' of the head instead of squaring it. The round headed chisel 16' is used on heavier steel plates where the bevels have already been burnt or planed in the plates. The chisel head 16' would be used to chip out the root of the first weld in all butts that are welded on both sides and then the chipped out side welded. On all joints welded from both sides, the root of the first weld shall be chipped to sound metal by the head 16' prior to welding the second side.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A chisel for cutting an elongated groove in metal work comprising an elongated steel cylindrical body including a shank, a cutting head reduced in diameter, and a handle for attachment to a pneumatic hammer, said head having opposed dished-out side portions constituting clearances to prevent binding or jamming, upwardly and outwardly tapering surfaces outwardly of the clearances, the top of the head terminating in a slightly downwardly slanted end, the bottom of the head being upwardly curved and intersecting the top slanted end forming a transverse cutting edge and intersecting the front end edges of the upwardly and outwardly tapering surfaces outwardly of the clearances forming edges disposed at an angle to said transverse cutting edge, the top of the head and said outwardly tapering surfaces defining cutting edges.

2. A chisel for cutting an elongated groove in metal work comprising an elongated steel cylindrical body including a shank, a cutting head reduced in diameter, and a handle for attachment to a pneumatic hammer, said head having opposed dished-out side portions constituting clearances to prevent binding or jamming, upwardly and outwardly tapering surfaces outwardly of the clearances, the top of the head terminating in a slightly downwardly slanted end, the bottom of the head being upwardly curved and intersecting the front end edges of the upwardly and outwardly tapering surfaces outwardly of the clearances forming edges, the end of the head and said outwardly tapering surfaces defining cutting edges.

References Cited in the file of this patent
UNITED STATES PATENTS

| | | |
|---|---|---|
| 1,360,618 | Brunelle | Nov. 30, 1920 |
| 1,611,574 | Armbruster | Dec. 21, 1926 |
| 2,172,984 | Moray | Sept. 12, 1939 |
| 2,392,495 | Nameth | Jan. 8, 1946 |